Patented July 20, 1954

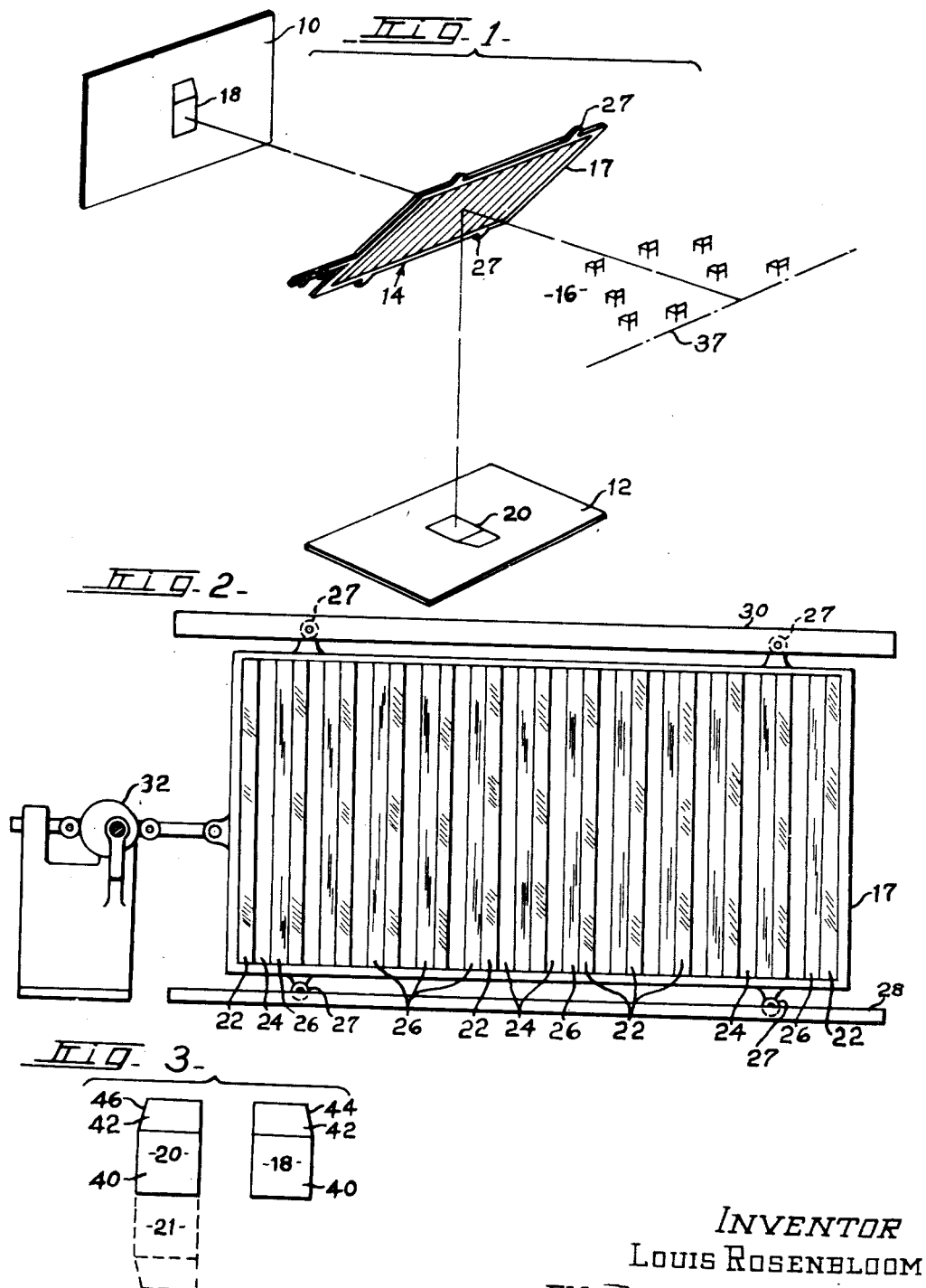

2,684,013

UNITED STATES PATENT OFFICE 2,684,013

STEREOSCOPIC VISUALIZER

Louis Rosenbloom, Geneva, N. Y.

Application May 20, 1952, Serial No. 288,860

7 Claims. (Cl. 88—16.6)

This invention relates to stereoscopic visualizers, and more particularly to a visualizer adapted to observation by a person or group of persons without requiring the use of any special apparatus by the observers.

Stereoscopic effect has been produced through use of polarized light, color filters, and the like. Such systems generally require the observer to employ devices similar to spectacles suitably fitted with polarized or colored eye pieces to effect the proper screening immediately adjacent the spectator's eyes, so that each eye will only see the correct image of a stereoscopic pair of images. Such devices render the stereoscopic display cumbersome and unnatural.

The present invention is directed to a stereoscopic visualizer system wherein spectators do not require screening devices, and in which a full stereoscopic effect is created. The invention further has to do with creating a stereoscopic effect in conjunction with relatively large views or images, and is adapted for use in presentation of still or motion pictures to groups, if desired.

An object of the invention is the provision of a stereoscopic visualizer which may be observed by a plurality of spectators without use of any special spectator equipment.

Another object of the invention is the provision of a stereoscopic visualizer capable of utilizing large still or motion pictures comprising stereoscopic pairs, in which a control grid is employed for screening the respective images from view of one eye or the other to create stereoscopic effect.

A further object of the invention is the provision of a system providing three-dimensional effect, utilizing images comprising stereoscopic pairs, wherein the images comprising the pairs are symmetrically disposed in relation to a grid comprising a plurality of recurring series of pairs of reflecting and transparent strip-like panels separated by opaque panels, and in which the grid is reciprocated in its own plane in a direction transverse to the strip-like panels.

The invention further has to do with the provision of a grid adapted to prevent both eyes of an observer from seeing the same parts of one image of a stereoscopic pair, while facilitating the simultaneous viewing of similar parts of both images, one eye being trained on one image and the other eye being trained on the other.

Still further, the invention is directed toward providing a screen composed of clear and reflecting panels for the viewing of the images of a stereoscopic pair by direct sight from one eye and reflected sight from the other, and in which there is introduced opaque panels disposed in relation to the clear and reflecting panels to block the sight of either eye from the incorrect image of the stereoscopic pair.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a diagrammatic view in perspective of a stereoscopic visualizer system embodying the invention;

Figure 2 is a front elevational view of the screen employed in Figure 1; and

Figure 3 is a front view of the images shown in perspective on the screens.

Referring to the drawings, there is shown an application of the invention, wherein two screens 10 and 12 are symmetrically disposed on either side of a grid 14, one of which screens 10 is positioned for direct view by observers located in the region of the seating area 16, which may be referred to as the viewing or perception area. The image 18 projected on screen 10, and the image 20 projected on screen 12, constitute a stereoscopic pair, the image 20 in screen 12, however, being reversed for reasons which will be understood upon a description of the grid 14.

The grid 14 is composed of a plurality of vertical strips mounted in a frame 11, the strips being arranged in repeating pairs of reflective and clear panels, each pair being separated by an opaque panel. In Figure 2, such strips as are reflective are indicated by the reference character 22, those clear by the character 24, and those opaque by reference character 26. Each of the reflective and clear strips is approximately 1¼" to 1½" wide, or approximately ½ the normal interpupillary spacing, the standard for which is generally accepted as 2½–3". The reflective surface of the strips 22 will be substantially in a plane bisecting the dihedral formed by the screens 10 and 12, so that the screens will be symmetrically disposed with respect to the plane of the respective surfaces.

The grid, in order to afford a view of the entire image on both screens, and to facilitate production of the desired stereoscopic three-dimension effect upon the observer, is mounted on rollers 27 to reciprocate on tracks 28 and 30, and suitable cam or crank mechanism is employed as at 32 to oscillate the screen. The amplitude of movement imparted to the screen should embrace at least the width of two panels, or 2½"–3", and in practice, a to-and-fro motion of uniform velocity or as near thereto as possible is desirable as by a uniform rise and fall cam, in preference to the simple harmonic motion of a crank mechanism.

The arrangement of the screens 10 and 12 at right angles to one another, with the grid arranged on a 45° angle, provides for unobstructed view, except as controlled by the grid, of the image 18 upon screen 10 and reflective view of the image 20 upon screen 12. The images may be projected upon the screen or the images 18 and 20 may be still pictures or motion pictures. In the latter case, coordination of the stereoscopic images is necessary to assure the substantially simultaneous projection if image pairs that are stereoscopic in their relation to each other.

The image 18 to be observed by the right eye by direct vision through the clear panels will be the right hand image of a stereoscopic pair. The image 20 to be observed by the left eye through the reflecting panels will be the left hand image of the stereoscopic pair, such image, however, being reversed to compensate for the reflected view thereof. Such images are shown in elevation in Figure 3, except for reversing of image 20 to compensate for the reflected view, the reversing being indicated in dotted line as at 21. The image shown for illustrative purposes is constituted by a rectangular block having a square front face 40 and the top rectangular face 42 in view. The bounding lines 44 and 46 of the stereoscopic pair are slightly oppositely inclined as would appear in a stereoscopic pair. Each image constitutes the true planar appearance of the block from two spaced points of view, the points being spaced as by the interpupillary distance.

The reflective panel and immediately adjacent clear panel to the right will thus simultaneously permit the left eye to view through the reflective panel, and the right eye through the clear panel the stereoscopically corresponding parts of the respective images 20 and 18.

Assuming the perception or viewing area 16 to have an outer boundary 37, if the grid be located half way between the outer boundary 37 and either image, spectators within the area will be prevented from seeing with both eyes simultaneously, any common portion of, for example, image 18, by reason of the width of the clear panel being ½ the interpupillary spacing. Likewise, a spectator within such area will be prevented from seeing with both eyes simultaneously any common portion of image 20 through the reflective panels, by reason of the width of the reflective panel being ½ the interpupillary spacing. The clear panels permit the right eye to view the right hand image 18. At the same time, the adjacent reflective panels immediately to the left of the clear panels permit the left eye to observe by reflection corresponding parts of the other image 20 on screen 12.

The line of sight by the right pupil, upon any observable point on image 18 and the line of sight of the left pupil upon the corresponding point on image 20 through reflection, will, so far as the observer is concerned, provide the natural convergence resulting from direct observation of a three-dimensional object. Image 18 and image 20 being a stereoscopic pair, will thus provide the usual effect of observing directly a three-dimensional object, since the respective images of a stereoscopic pair are constituted by the projected views of the object upon a plane as taken from observation points spaced as by the interpupillary distance.

Thus, a mirror panel and an adjacent clear panel to the right thereof affords opportunity for the left eye and the right eye to simultaneously observe the corresponding parts of the reflected image 20 and the direct image 18, respectively. In order to assure that the right eye will always be trained upon the image 18, and through the clear panels, and that the left eye will always be trained upon the reflecting panels and the reflected image 20, opaque panels are disposed to the right of the clear panel and to the left of the reflective panel of each clear and reflective panel pair. By such arrangement, the vision of each eye on the respective correct image of the stereoscopic pair is assured.

For example, if the opaque panels were to be omitted, and the clear and reflective panels arranged in an alternating series, without opaque panels, there would be nothing to prevent the right eye from diverting from sight through the clear panels, to a line of reflected sight, causing the left eye to shift from reflected line of sight to a direct line of sight through the clear panels. Such an arrangement would create nothing but confusion and destroy any sense of stereoscopic effect, because the right eye would then be directed toward the left hand image of the stereoscopic pair and the left eye directed toward the right hand image.

In stereoscopic viewing devices, it is essential that some means be provided to mechanically enforce one eye to view the correct image of a stereoscopic pair, and that image only, and the other eye to view only the other image of the pair, and the mechanical means for accomplishing this result in the present invention is the provision of the opaque panels on either side of each pair of reflective and clear panels, such opaque panels spacing each reflective and clear panel pair.

While an arrangement has been shown in which the images 18 and 20 are angularly disposed in symmetrical relation to the plane of the reflecting panel surfaces, the images can be arranged parallel with one another in symmetry, and viewing thereof can take place from a viewing area between the grid and reverse image. Any arrangement in which one image is in direct view, and in which the other image is symmetrically disposed with respect to the mirror surfaces of the reflecting panels will be effective. In practice, the arrangement is such that the grid be positioned approximately half way between the direct image 18 and the outer boundary 37 of the viewing or perception area 16, or that the image be so arranged by mirrors that it appears to be as far away or farther than the farthest point or outer boundary of the perception area. Where the grid is at an angle as shown, it would be preferable that the viewing area be so confined that all observation points are no farther spaced from any part of the grid that is effective in screening the image, than the image, since the width of the clear and reflective strips are only completely effective in preventing both eyes from seeing simultaneously a common point on one image, when the observation point is no more than double the distance between the image and the part of the grid controlling the view of the image.

Where the images are mounted or made to appear on parallel planes, the grid may be located as a wall of a room, the reverse image appearing on the opposite wall, and the direct image located a corresponding effective distance beyond the wall formed by the grid. The viewing area would thus be the space between the grid and reverse image.

While the mirror and clear panel pairs have been described with the mirror panel to the left of the clear panel, the reverse may be used, but in such case, the images of the stereoscopic pair must be reversed; that is, the right image must appear on the screen viewed through the reflector panels, instead of the screen viewed through the clear panels, and the left image must be changed accordingly.

The width of the opaque panels has been made equal to the width of either the clear or reflective panels.

Rapid oscillation of the grid at a speed so as to escape notice thereof will be desirable, and the rate of oscillation should be such, in the case of motion pictures, that opportunity is afforded to view each entire frame.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a stereoscopic visualizer, a pair of images comprising a stereoscopic pair, one image being reversed with respect to the other, an intermediate grid, said images being symmetrically disposed with respect to and on opposite sides of said grid except for the stereoscopic variation between said images, said grid being composed of repeating series of three parallel narrow panels all lying in the plane of the grid, each of a width approximately one-half of the interpupillary spacing, each of said series of panels consisting of an opaque, a reflective, and a transparent panel, in like order, and means for rapidly oscillating said grid crosswise of said panels through a distance equal to at least the width of two panels.

2. In a stereoscopic visualizer, a pair of images comprising a stereoscopic pair, one image being reversed with respect to the other, an intermediate grid, said images being symmetrically disposed with respect to and on opposite sides of said grid except for the stereoscopic variation between said images, said grid being composed of a plurality of repeating series of three parallel narrow panels all lying in the plane of the grid, each of a width approximately one-half of interpupillary spacing, each of said series of panels consisting of an opaque, a reflective, and a transparent panel, in like order, said reflective panels facing said reverse image, and means for rapidly oscillating said grid crosswise of said panels with substantially uniform motion through a distance equal to at least the width of two panels.

3. In a stereoscopic visualizer, a pair of images comprising a stereoscopic pair, one image being reversed with respect to the other, an intermediate planar grid, said images being symmetrically disposed with respect to and on opposite sides of said grid except for the stereoscopic variation between said images, said grid being composed of repeating series of pairs of panels arranged side by side in the plane of said grid, each panel being of a width approximately one-half of the interpupillary spacing, each pair consisting of a reflective and a transparent panel, an opaque panel spacing each pair, and means for rapidly oscillating said grid crosswise of said panels through a distance equal to at least the width of two panels.

4. In a stereoscopic visualizer, a grid adapted to be disposed on a plane of symmetry between the planes of a stereoscopic pair of images, one image being reversed with respect to the other, said grid being composed of a plurality of repeating series of three parallel panels, each of a width approximately one-half of interpupillary spacing and lying in the plane of said grid, each of said series of panels consisting of an opaque, a reflective, and a transparent panel, in like order, and means for mounting said grid for oscillation crosswise of said panels, and means for oscillating said grid in said mounting means.

5. In a stereoscopic visualizer, a pair of images comprising a stereoscopic pair, one image being reversed with respect to the other, an intermediate grid, said images being symmetrically disposed with respect to and on opposite sides of said grid except for the stereoscopic variation between said images, said grid being composed of repeating series of three parallel panels, each of a width approximately one-half of the interpupillary spacing and lying in the plane of the grid, each of said series of panels consisting of an opaque, a reflective, and a transparent panel, in like order, and means for rapidly oscillating said grid crosswise of said panels through a distance equal to at least the width of two panels, and a viewing area on the reflective side of the grid confined to a distance from the grid not greater than the spacing between the grid and either of said images, and located for reflective viewing of the reverse image and direct viewing of the other image through said transparent panels.

6. In a stereoscopic visualizer, a pair of images comprising a stereoscopic pair, one image being reversed with respect to the other, an intermediate grid, said images being symmetrically disposed with respect to and on opposite sides of said grid except for the stereoscopic variation between said images, said grid being composed of a plurality of repeating series of three parallel panels, each of a width approximately one-half of interpupillary spacing and lying substantially in the plane of the grid, each of said series of panels consisting of an opaque, a reflective, and a transparent panel, in like order, said reflective panels facing said reverse image, means for rapidly oscillating said grid crosswise of said panels with substantially uniform motion through a distance equal to at least the width of two panels, and a viewing area on the reflective side of the grid confined to a distance from the grid not greater than the spacing between the grid and either of said images, and located for reflective viewing of said reverse image and direct viewing of the other through said transparent panels.

7. A stereoscopic visualizer according to claim 1, in which the oscillatory means provides uniform motion of the grid in both directions of movement.

References Cited in the file of this patent

UNITED STATES PATENTS

| Number | Name | Date |
|---|---|---|
| 2,240,131 | Carrè | Apr. 29, 1941 |
| 2,307,276 | Keyzer | Jan. 5, 1943 |
| 2,484,334 | Darimont | Oct. 11, 1949 |

FOREIGN PATENTS

| Number | Country | Date |
|---|---|---|
| 937,781 | France | Aug. 26, 1948 |